United States Patent [19]

Lindsay

[11] 4,106,258

[45] Aug. 15, 1978

[54] MOBILE BUILDING FLOOR JOIST ASSEMBLY

[76] Inventor: Fredrick H. Lindsay, Rte. 1 Box 71, Darwin, Minn. 55324

[21] Appl. No.: 813,003

[22] Filed: Jul. 5, 1977

[51] Int. Cl.² .............................................. E04C 3/02
[52] U.S. Cl. ...................................... 52/693; 52/643
[58] Field of Search ................ 52/372, 376, 692–696, 52/648, 643

[56] References Cited

U.S. PATENT DOCUMENTS

| 1,911,018 | 5/1933 | Goeltz | 52/648 |
| 2,421,197 | 5/1947 | Green | 52/694 |

FOREIGN PATENT DOCUMENTS

| 1,176,026 | 11/1958 | France | 52/376 |
| 2,456,914 | 12/1976 | Fed. Rep. of Germany | 52/693 |
| 1,068,761 | 5/1967 | United Kingdom | 52/693 |
| 637,844 | 5/1950 | United Kingdom | 52/376 |
| 679,953 | 9/1952 | United Kingdom | 52/693 |

*Primary Examiner*—James L. Ridgill, Jr.
*Attorney, Agent, or Firm*—Woodard, Weikart, Emhardt & Naughton

[57] ABSTRACT

Disclosed is a composite wood and steel joist assembly in which steel channel members form a U-shaped configuration with inwardly extending portions formed at the free ends of the legs. The steel channel members forming this configuration have their open sides facing outwardly. Wooden members of rectangular cross-sectional configuration are inserted and secured within the bight of the channel members so that wood surfaces, accepting wood fasteners such as nails or staples, are presented outwardly around the complete perimeter of the joist assembly.

2 Claims, 5 Drawing Figures

MOBILE BUILDING FLOOR JOIST ASSEMBLY

BACKGROUND OF THE INVENTION

My U.S. Pat. Nos. 3,716,267 and 4,015,375 disclose unified floor frame assemblies for constructing a building. In the latter of the two patents mentioned above there is disclosed, as components of the floor frame structure, a floor joist formed of wood which is spaced along dual, parallel, steel I-beams. Because of newly applied and proposed Federal code requirements for mobile buildings, the floor joists were spaced relatively closely. While code requirements were met by the earlier structure, the relatively large number of joist assemblies required in the structure add substantially to the cost of the building.

The present application discloses an improved floor joist assembly for use in a floor frame assembly such as that disclosed in my U.S. Pat. No. 4,015,375. It is formed by both wood and steel components but these are arranged so that the steel portion provides improved rigidity and load bearing capacity. The wooden components are mounted so that they face outwardly around the perimeter of the joist assembly and thus provide wood surfaces for nailing, stapling or the like. Application of the flooring, insulation and bottom board or covering can thus proceed using conventional nailing or power-stapling techniques. This can occur even though the core of the assembly is formed of steel (channel) structural members.

The result is that the joist assemblies may be more widely spaced (a distance of the order of 48 inches) while conventional two by four lumber may be used at, for example, 16 inch spacing between the joist assemblies. The number of joist assemblies necessary for a given structure to meet code requirements is thus reduced as, correspondingly, is the over-all cost of the building. After completion of the installation of the floor components (both floor and bottom board components) the steel components of the joist assembly are enclosed within the floor structure eliminating the necessity for, and cost of, painting the steel. Moisture and rusting problems, over the long term, are minimized thereby reducing maintenance by the owner of the mobile building.

DESCRIPTION OF THE PREFERRED EMBODIMENT

Figure 2:
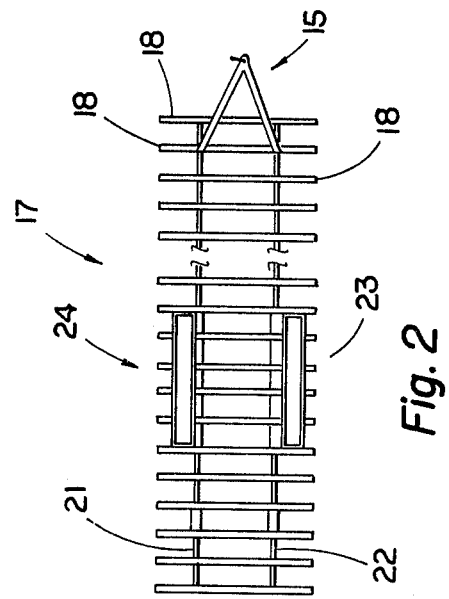
FIG. 2 is a fragmentary, bottom plan view of the building of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as would normally occur to one skilled in the art to which the invention relates being included.

Figure 1:
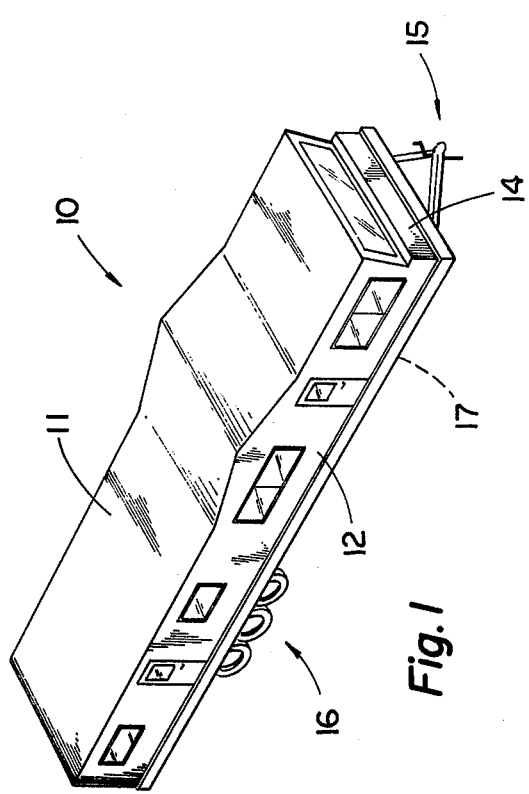
FIG. 1 is a perspective view of a mobile building incorporating the present invention.

Referring initially to FIGS. 1 and 2, 10 identifies a mobile building having a roof 11 mounted atop a pair of side walls 12 and end walls 14. A wheeled carriage 16 may be provided to facilitate transportation of the building when attached to a prime mover vehicle by means of the hitch 15. The hitch 15 and the carriage 16 are, conventionally, both removed from the building after it has reached its ultimate site where it may rest on suitable piers (not shown). FIG. 2 shows, somewhat schematically, a unified floor frame assembly provided with spaced joists 18 disposed along the longitudinal I beams 21 and 22. These two steel I beams extend the length of the frame and form the primary longitudinal, structural members for the frame. Wheel wells 23 and 24 are provided in the floor frame assembly, the wheel wells being similar to the wheel wells disclosed in my U.S. Pat. No. 3,716,267 previously mentioned.

Figure 3:
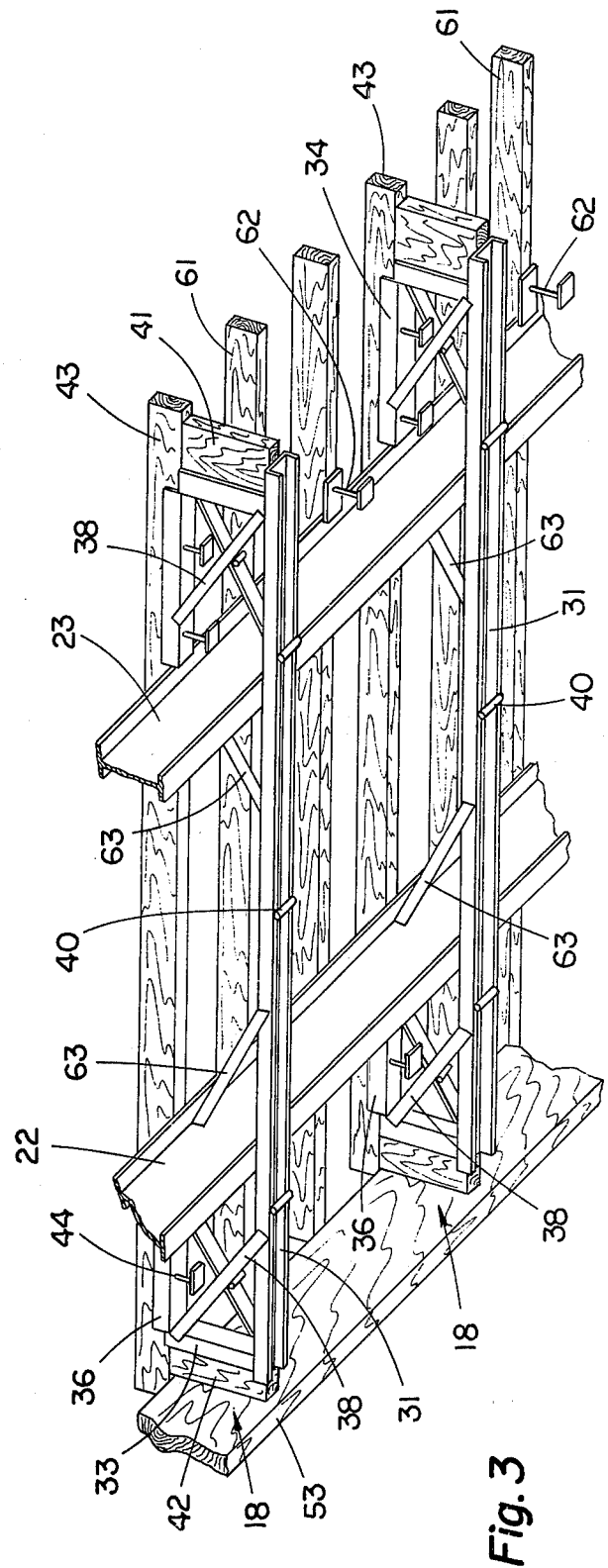
FIG. 3 is a fragmentary, perspective view of joist assemblies of the present invention installed in a floor frame assembly, with the bottom board component being omitted for clarity.
Figure 4:
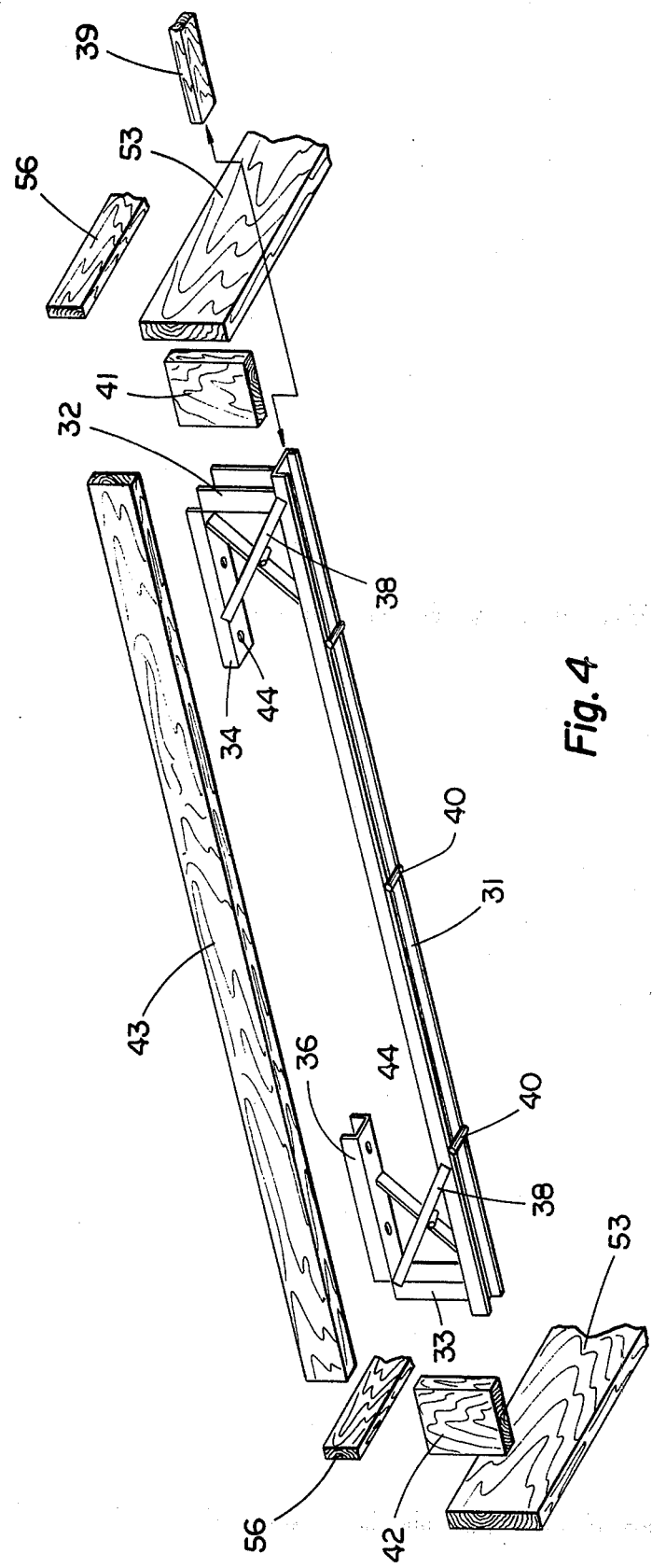
FIG. 4 is a perspective, exploded view of the joist frame assembly of the present invention.
Figure 5:
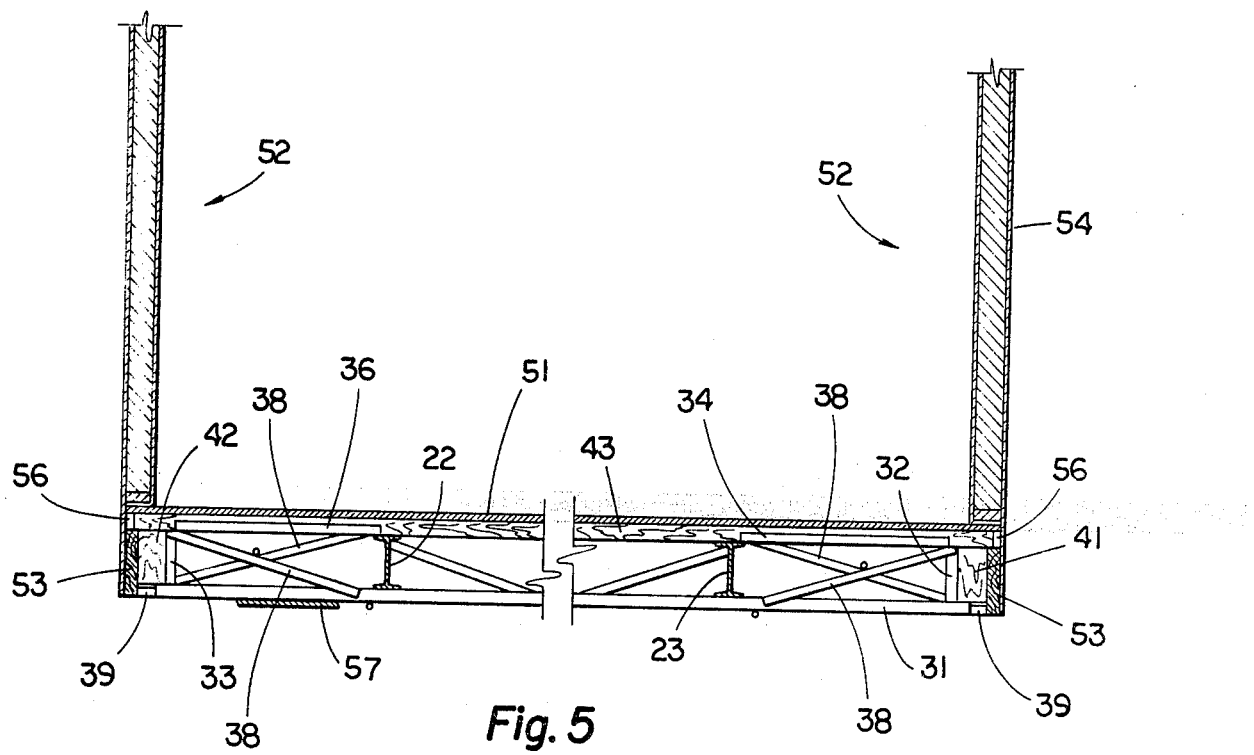
FIG. 5 is a side view of the joist assembly of the present invention shown with the building side walls in place together with the floor decking and the insulation and bottom board which are shown fragmentarily.

Referring to FIGS. 3, 4 and 5, the floor joist assembly of the present invention will be described in detail and its incorporation into the floor frame assembly will be described, particularly with reference to FIGS. 3 and 4. Referring to FIG. 4, the joist assembly may be seen to comprise a horizontal steel channel member 31 which defines the lower margin of the joist assembly and which at its ends, but inset somewhat, carries upright steel channel members 32 and 33.

Extending inwardly from each of the upright members are upper, steel channel members 34 and 36, cross braces 38 serving to rigidify the assembly. The upper members 34 and 36 are axially aligned and are parallel to the underlying horizontal member 31. It will be noted that all of the steel channel components 31, 32, 33, 34 and 36 have their open side facing outwardly. This permits positioning of the wooden components of the assembly now to be described.

Inserted within the bight of the channel 31 is a wooden member 39 of rectangular cross-section sized to fit snuggly within the channel 31. The steel rod sections 40, welded to the edges of the flanges of the channel 31, function as spaced fasteners retaining the wooden member 39 within the channel. The upright channel members 32 and 33 receive within their bight the wooden blocks or plates 41 and 42, respectively. Received within the bight of the inwardly projecting channel members 34 and 36 is the wooden member 43 which spans the open space between the channels 34 and 36 and which extends somewhat beyond the outer ends of these channel members as will be particularly evident from FIG. 5. The members 34 and 36 may be provided with apertures 44 through which lag bolts may be inserted for securing the wooden member 43 in place. Again, as may best be seen in FIG. 5, the wooden member 43 is of substantially greater height than the flanges of the channel members 34 and 36. The member 43, in length, also extends beyond the outer margin of the blocks 41 and 42 and beyond the outer ends of the wooden member 39. With dimensions so determined, the steel members 31, 34 and 36 and the wooden members 39 and 43 all are of slightly differing lengths to thereby laterally space their end margins and thus strengthen, against vertical loading, their juncture with adjacent structural members now to be described.

As may be seen in FIG. 5 floor decking 51 may be attached to the upper surface of the members 43 and conventional side wall structures 52 may be erected. Longitudinal members 53 may be positioned so as to abut the outer margin of the members 39 a 41 and 42 with the outer face member or sheath 54 of the side wall extending into overlying relation with respect to the longitudinal members 53. A longitudinal filler member 56 extends between the ends of the member 43 and the adjacent inner surface of the face members 54. A bottom board extending between the adjacent joist assemblies is identified at 57 (shown fragmentarily in FIG. 5) and thermal insulation is, of course, interposed between the joist assemblies.

In FIG. 3 two joist assemblies are shown installed in the floor frame of the building, however, the bottom board component (conventionally plywood secured between the joist assemblies 18, as indicated in FIG. 5) is not shown. It will be noted that the joist assemblies 18 are relatively widely spaced on four foot centers, for example. The space between the joist assemblies may be filled in by wooden transverse members 61 on, for example, 16 inch centers. Members 61 may be secured to the beams 22 and 23 by means of plates and lag bolts 62. The joist assemblies 18 may be braced in position on the I-beams 22 and 23 by means of the diagonal braces 63. It will be noted that the distance between the horizontal, steel channel member 31 and the overlying channel members 34 and 36 is sized to accommodate the depth of the longitudinal I-beams 22 and 23. As previously mentioned, the unified floor frame assembly itself is disclosed in my U.S. Pat. No. 4,015,375.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A composite wood and steel joist assembly comprising a horizontal steel channel member defining the lower margin of said joist assembly, upright steel channel members extending vertically from said horizontal member adjacent each of its ends, upper steel channel members extending a relatively short distance inwardly from each of said upright members, said upper members being axially aligned and parallel to said horizontal member, all of said steel channel members having their open side facing outwardly, a first unitary wooden member of rectangular cross-section nested within the bight of said horizontal channel member and extending beyond the ends thereof, a second unitary wooden member of rectangular cross-section spanning the upper channel members nested within the bight of said upper channel members and extending beyond the outer ends thereof, said first and second unitary members having slightly differing lengths to thereby laterally space their end margins and thus strengthen their juncture with adjacent structural members against vertical loading, and vertical wooden members nested within the bight of said upright channel members and disposed between the extending end portions of said first and second wooden members, whereby wood surfaces for accepting fasteners are presented outwardly around the complete perimeter of the joist assembly.

2. A composite joist assembly as claimed in claim 1 in which the distance between said horizontal channel members and said upper channel members is adapted to accommodate beams extending normal to said joist assembly and closely adjacent the free ends of said upper steel channel members.

* * * * *